United States Patent
Kustermann et al.

(10) Patent No.: US 6,387,214 B1
(45) Date of Patent: May 14, 2002

(54) DEVICE TO ACTIVELY WEAKEN UNDESIRABLE VIBRATIONS IN A ROTATING ROLL; DEVICE FOR TREATMENT OF A MATERIAL WEB, SPECIFICALLY A PAPER OR CARDBOARD WEB

(75) Inventors: Martin Kustermann, Heidenheim; Alexander Klug, Nordlingen, both of (DE)

(73) Assignee: Voith Sulzer Papiertechnik Patent GmbH, Heidenheim (DE)

(*) Notice: Subject to any disclaimer, the term of this patent is extended or adjusted under 35 U.S.C. 154(b) by 0 days.

(21) Appl. No.: 09/368,973

(22) Filed: Aug. 5, 1999

(30) Foreign Application Priority Data

Aug. 6, 1998 (DE) .......................... 198 35 649
Jul. 2, 1999 (DE) .......................... 199 30 600

(51) Int. Cl.$^7$ ................................. D21F 7/00
(52) U.S. Cl. .................. 162/198; 162/263; 162/252
(58) Field of Search .................. 162/198, 199, 162/203, 204, 205, 252, 262, 263, 265, 272, 358.1; 700/127, 128, 129; 73/1.82, 1.84, 570, 649, 862.41, 862.451, 862.55

(56) References Cited

U.S. PATENT DOCUMENTS

| | | | |
|---|---|---|---|
| 4,290,253 A | * 9/1981 | Pav et al. ............... 100/162 B |
| 4,546,425 A | * 10/1985 | Breitholtz .................... 700/33 |
| 4,902,384 A | * 2/1990 | Anstotz et al. ............. 162/252 |
| 5,096,541 A | * 3/1992 | Arnhold et al. ............. 162/199 |
| 5,117,081 A | * 5/1992 | Bagdal ....................... 219/69.1 |
| 5,403,447 A | * 4/1995 | Jarvinen et al. .......... 162/358.1 |
| 5,562,027 A | 10/1996 | Moore .......................... 100/35 |
| 5,596,931 A | 1/1997 | Rossler et al. .............. 101/484 |
| 5,629,487 A | 5/1997 | Mücke et al. ................. 73/818 |
| 5,703,574 A | * 12/1997 | Allonen ................. 340/870.07 |
| 5,783,898 A | 7/1998 | Wu ............................. 310/316 |
| 5,909,855 A | * 6/1999 | Jorkama et al. .......... 242/414.2 |
| 5,915,297 A | * 6/1999 | Lehtovirta et al. .......... 100/336 |
| 5,961,899 A | * 10/1999 | Rossetti et al. ............. 264/40.1 |
| 5,971,315 A | * 10/1999 | Kojo ........................ 242/534.2 |
| 6,156,158 A | * 12/2000 | Kustermann ................ 162/198 |

FOREIGN PATENT DOCUMENTS

| | | | |
|---|---|---|---|
| DE | 24 59 223 | 4/1978 | ............ G01H/1/00 |
| DE | 42 32 920 A1 | 3/1994 | ............ F16F/15/10 |
| DE | 44 12 945 A1 | 10/1995 | ............ B41F/33/14 |
| DE | 196 29 205 A1 | 1/1998 | ............ F16F/15/02 |
| DE | 196 42 047 A1 | 4/1998 | ............ D21F/3/00 |
| DE | 196 52 769 A1 | 6/1998 | ............ D21G/1/02 |
| DE | 198 21 854 C1 | 7/1999 | ............ F16F/15/02 |
| EP | 0 538 221 A2 | 4/1993 | ............ G01L/5/00 |
| EP | 0 612 933 A1 | 8/1994 | ............ F16F/15/18 |
| GB | 2165667 A | 4/1986 | .......... G05D/19/02 |
| GB | 2312972 A | 12/1997 | .......... G05D/19/02 |
| WO | WO 97/03832 | 2/1997 | ............ B41F/13/08 |

OTHER PUBLICATIONS

Technology Review, Stowe Woodward Moves Up The Value Ladder.
Lewin, A., u.a.: Heterodyn–Interferometer zur Vibrationsana Lysel. In: Technisches Messen 57, 1990, 9, pp. 335–345.

* cited by examiner

Primary Examiner—Peter Chin
Assistant Examiner—Eric Hug
(74) Attorney, Agent, or Firm—Taylor & Aust, P.C.

(57) ABSTRACT

A device to actively reduce undesirable vibrations in a rotating roll includes at least one sensor arrangement to detect/measure the undesirable vibrations and at least one power unit device which, dependent upon the detecting/measuring result, influences the roll to reduce the undesirable vibration. The sensor arrangement includes at least one sensor which, relative to the rotational axis of the roll, is located radially inside the substantially circular cylindrical outer surface of the roll and/or at least one sensor which is located remotely from the substantially circular cylindrical outer surface of the roll.

30 Claims, 2 Drawing Sheets

DEVICE TO ACTIVELY WEAKEN UNDESIRABLE VIBRATIONS IN A ROTATING ROLL; DEVICE FOR TREATMENT OF A MATERIAL WEB, SPECIFICALLY A PAPER OR CARDBOARD WEB

BACKGROUND OF THE INVENTION

1. Field of the Invention

The present invention relates to an apparatus and method to actively reduce the magnitude of undesirable vibrations in a rotating roll. More particularly, the present invention relates to an apparatus and method to actively reduce undesirable vibration in a device for the treatment of a material web, specifically a paper or cardboard material web.

2. Description of the Related Art

A device to actively reduce the magnitude of undesirable vibrations in a rotating roll is described, for example, in German patent document no. DE 196 52 769 A1. In accordance with a first design alternative described therein, a vibration sensor is located at one bearing position, or at the bearing positions of the roll. In accordance with a second design alternative described in German Patent document no. DE 196 52 769 A1, it is suggested to locate the vibration sensor at the machine center. In an experimental arrangement, a capacitive sensor was located in the machine center, i.e., in the area of the longitudinal roll center, close to the substantially circular cylindrical roll shell. Positioning the vibration sensor in the area of the machine center offers the advantage that the amplitude of vibrations of a roll can be accurately measured due to the substantial distance of the sensor from the bearing positions of the roll, and from the significant "swings" of the roll resulting from the substantial distance separating the roll bearings (for example due to additional deflection vibration contributions). It is, however, a disadvantage that the capacitive sensor must be located in close proximity to the roll surface.

When utilizing the vibration weakening device in a machine for the production and/or coating of a material web, specifically a paper or cardboard web, there is an inherent risk of damage to the sensor in the event of a web break and the subsequently resulting "wrap-up" of the roll. There is also the danger that the ability of the sensor to function may be impaired due to contamination from coating medium, fiber components, etc. In addition, a sensor located in immediate proximity to the shell surface of the roll makes access to the roll shell more difficult for maintenance or operating personnel. It has, after all, proven difficult to precisely measure the vibration amplitude on coated surfaces, for example rubber coated surfaces and/or surfaces covered with a layer of coating medium.

Sensors which are located at the bearing positions of the roll do not exhibit the aforementioned disadvantages. However, due to the fact that the bearing positions coincide with the nodal points of the undesirable roll vibrations, it is considerably more difficult to measure the vibration amplitudes with the necessary precision at the bearing/mounting positions than it is in the area of the machine center.

Patent document no. WO 97/03832 describes a process and a device for the reduction of deflection vibrations in rotating systems which are designed for utilization with impression cylinders in rotogravure presses. However, the working width and running speed of material webs in rotogravure presses of this type are considerably different from that in a machine for the production and/or coating of material webs.

SUMMARY OF THE INVENTION

The present invention provides a method and apparatus that enable precise detection and measurement of the roll vibration amplitudes and is not susceptible to contamination and damage, and permits unhampered access to the shell surface of the roll by operating and/or maintenance personnel. A sensor arrangement having at least one sensor is located radially inside the substantially circular cylindrical outer shell surface of the roll relative to the rotational axis of the roll and/or at least one sensor is located remotely from the substantially circular cylindrical shell surface of the roll. The sensor arrangement measures the undesirable vibrations. A power unit device influences, dependent upon the measuring result, the roll in order to reduce the undesirable vibration. The apparatus and method of the present invention are intended for utilization in machinery for the production and/or treating of, and particularly for applying a coating to, a material web, specifically a paper or cardboard web.

A sensor device is located under the roll surface. In this location it is neither at risk from contamination through exposure to coating material, nor is the sensor device at risk of damage due to a web break. In addition, with the sensor located under the roll surface, free access to the roll surface is assured. Further, a sensor device is located in the area of the machine center, i.e., in the area of the longitudinal center of the roll, thereby enabling a high precision measurement of the amplitude of the roll vibration.

The sensor device includes at least one compression and/or tension sensitive element such as, for example, a wire strain gauge. Sensor elements of this type have proven themselves rugged, reliable and precise especially when applied for the purpose of detecting/measuring mechanical stress conditions. The compression and/or tension sensitive element may, for example, be located on the inside surface of the roll cylinder where it is protected by the roll shell (which may, for example, be manufactured from steel) from exterior influences caused by, for example, a web break. In the instance of internally cooled rolls, it must be ensured that the compression and/or tension sensitive element is resistant to the cooling medium, for example, water. In addition, or as an alternative, a compression and/or tension sensitive element is located on the outside surface of the roll cylinder underneath the roll surface cover layer which is, for example, formed of a protective layer of rubber, rubber-type material, synthetic material or other similar material. In such an arrangement, the compression and/or tension sensitive element is protected from exterior influences by the protective roll cover/layer. More particularly, the compression and/or tension sensitive element is protected from damage in the event of a web break and from contamination through exposure to coating medium when located under the protective roll cover/layer.

A sensor device is also located remotely from the roll surface. The distance between the sensor device and the roll surface is selected so that the sensor device is neither contaminated through exposure to coating medium splashes, nor damaged in the event of a web break. In addition, unhampered access to the roll surface is assured due to the distance between the sensor device and the roll surface. Again, location of the sensor device in the area of the machine center ensures precise detection/measurement of the roll vibration amplitude. In a machine equipped with two rolls which together form a "nip" through which the material web travels, signals can be detected/measured particularly effectively by placing a sensor device in the connecting plane of the axes of the two rolls. Remote vibration detection/measurement is provided simply and reliably by a sensor device that includes at least one optical sensor unit. In order to ensure free access to the shell surface of the roll, it is advantageous to locate the optical sensor unit at a distance of at least one meter from the roll surface.

Sensor units based on various principles of measurement can be utilized. The optical sensor device may, for example, be a laser-vibrometer, which may be purchased, for example, under the identification VH 300 from Ometron, Inc., Dulles, USA. This laser-vibrometer detects/measures the vibration of the roll as the component of the speed of the surface of the rotating roll that is progressing parallel to the laser bean conducting the measurement. In addition, or as an alternative, the sensor device can include an interferometrically operating sensor device that detects/measures mechanical tension/stress conditions of the roll surface. Such interferometric sensor devices are used in the area of non-destructive materials analysis. The interferometric sensor device detects/measures the mechanical tension/stress conditions, for example, at the substantially circular cylindrical shell surface of the roll.

In addition, or as an alternative, the interferometric sensor device measures the mechanical tension/stress conditions in the area of a header section of the roll, in which the roll surface tapers from the substantially circular cylindrical shell surface to the roll journals. The changes in the surface tension/stress of the roll caused by undesirable vibrations are especially pronounced and distinct in the transition area between the shell surface and the header section, as well as in the transition area between the header section and the roll journal. Measuring the mechanical tension/stress conditions of the roll in the area of the header section has the additional advantage that the interferometric sensor device may be located prior to, or after, the roll, viewed in direction of the roll axis, thereby not hampering free access to the shell surface of the roll. The tension/stress conditions in the header area may, however, also be detected/measured by other suitable sensors such as, for example, wire strain gauges.

The present invention also includes a control unit which, based on the detected/measured signals of the sensor device, determines actuating signals for the power unit device. The control unit, for the purpose of determining the actuating signals, combines the measured signals from a multitude of sensors additively and/or subtractively and/or weighted and/or averaged and/or phase corrected. This allows for consideration of peculiarities in the vibration characteristics of the roll, depending upon prevailing operating parameters, and peculiarities of the utilized sensor devices, specifically with regard to their sensitivity to certain ranges of vibration frequencies. The control unit also considers the measured signals of at least one sensor device located at the bearings of the roll such as, for example, a compression and/or tension sensitive element, an acceleration sensor (for measuring radial accelerations), or the like.

In addition, the present invention provides a method to actively weaken undesirable vibrations of a rotating roll. The undesirable vibrations are detected/measured by use of a sensor. A power unit device influencing the roll is triggered dependent upon the detected/measured results, thereby weakening the undesirable vibrations.

As used herein, the terminology "in the area of the machine center" refers to a relatively wide area around the exact longitudinal center of the roll. The reason for this is that, in a good first approximation and with consideration of occurring centrifugal forces, the deformation of the roll due to vibration follows a parabola that progresses between the two side bearing positions and is substantially symmetric about the machine center. The value of a parabola changes only slightly in the maximum range. Thus, with regard to the precision of the measurement of the vibration swings of the roll, the "area of the machine center" can, therefore, be defined as the area between the two points in axis direction of the roll in which the vibration swing is approximately 75% of the maximum swing in the exact machine center.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
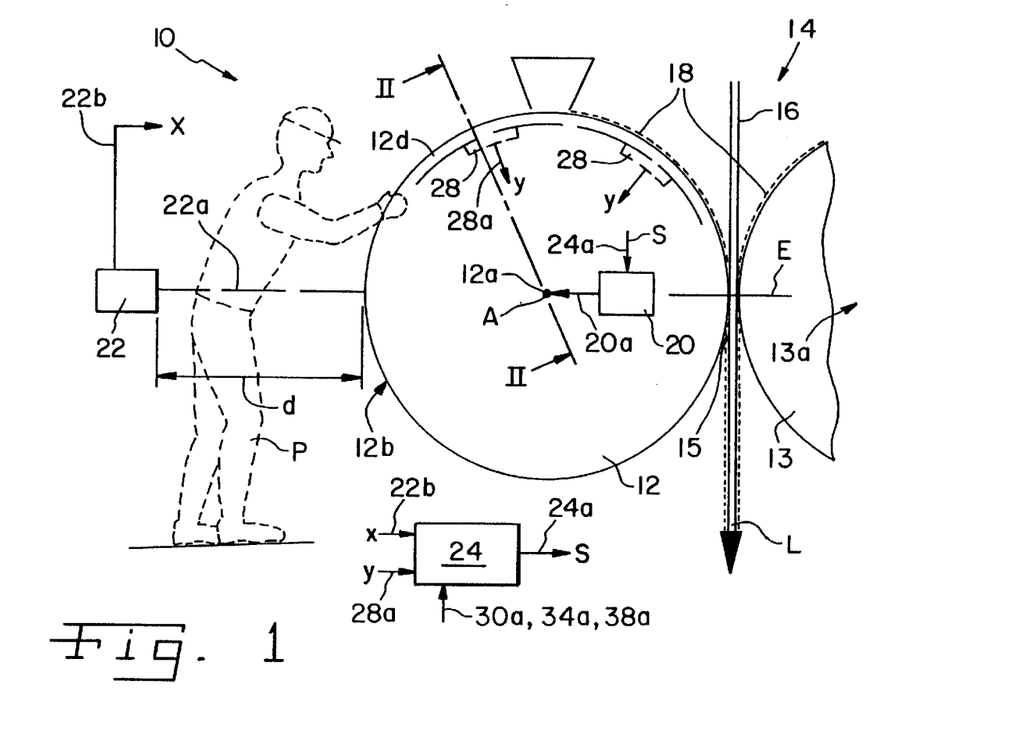
FIG. 1 is a schematic illustration of an embodiment of an apparatus to actively reduce undesirable vibrations of a rotating roll of the present invention.

Referring now to the drawings and particularly to FIG. 1, there is shown a device to actively weaken vibration in accordance with the present invention generally designated 10. In the embodiment shown, device 10 serves to weaken, compensate, reduce or dampen undesirable vibrations of roll 12 rotating around an axis A in a coating device 14 intended for indirect two-sided coating of a material web 16 with a liquid or viscous coating medium 18. The material web 16 travels in flow direction L through a nip 15 which is formed between two neighboring rolls 12 and 13.

It should, however, be pointed out that the device of the present invention can also be utilized advantageously with other rotating rolls of the type frequently used in machinery for the production and/or coating of material webs, specifically paper or cardboard webs.

Active weakening device 10 includes at least one power unit 20 which, through a positioning actuator 20a, influences the journal 12a of roll 12. The influence occurs out-of-phase, preferably in phase opposition to the undesirable vibrations of roll 12.

To detect/measure the vibrations of roll 12, a series of different sensor devices are utilized which will be discussed in detail below. The sensor devices are positioned at locations where they are not exposed to the danger of contamination and/or damage, and where they do not hamper free access to the roll surface 12 by maintenance or operating personnel P.

Laser-vibrometer 22 is located at a distance d from the roll surface 12b, whereby the laser jet 22a is pointed onto the roll surface 12b. Such laser-vibrometers available under product description VH 300 from Ometron Inc., Dulles, USA. Laser-vibrometers of the aforementioned type determine the vibrations of the roll 12 from the component of the speed of roll surface 12b that is aligned parallel to the laser beam 22a. In order to obtain a measurement precision that is as accurate as possible, the laser-vibrometer 22 is located preferably in plane E which connects the axes 12a and 13a of the two rolls 12, 13.

The detection/measurement signal of laser-vibrometer 22 is transmitted via a signal line 22b to a control unit 24 which, utilizing the detection/measurement signal, determines actuating signals and then transmits the actuating signals via a signal line 24a to power unit 20.

The laser-vibrometer 22 has the advantage that it can be located at a very large distance d from roll surface 12b, such as, for example, at a distance d of more than one meter. Such large distances ensure that there is sufficient room available for maintenance and/or operating personnel P in the area of roll 12, and to permit unhampered access to roll surface 12b. In addition, the large distance between roll surface 12b and laser-vibrometer 22 ensures that, in the event of a break of material web 16 and the frequently resulting "wrap-up" of the roll 12, the laser-vibrometer is not damaged by material web 16. Additionally, laser-vibrometer 22 is protected from contamination due to splashes from the coating medium 18. In a worst case scenario, a simple diaphragm system (not shown) may additionally be necessary. Due to the large distance from the roll surface 12b, the laser-vibrometer 22 may be located without problem in the area of the machine center, that is in the area of the longitudinal center of roll 12. In this area, the vibration of the roll 12 leads to very strong swings of the roll surface 12b, thereby permitting a very precise measurement of the vibrations of roll 12.

Another type of sensor for measuring the vibrations of roll 12 are the compression and/or tension sensitive elements 28 which are illustrated in FIG. 1 and which are located on the interior surface 12c (FIG. 2) of the roll shell 12d. The compression and/or tension sensitive elements 28 may, for example, take the embodiment of conventional wire strain gauges. It is, however, also possible to utilize any other type of compression and/or tension sensitive elements, films, or similar devices. Since a single one of these elements 28 is able to detect/measure the vibrations of the roll 12 only at a certain point of the roll, it is advantageous to place a multitude of these compression and/or tension sensitive elements 28 around the circumference of the roll 12, as indicated in FIG. 1 over a section of the interior circumference of the roll 12. The detection/measurement signals of the elements 28 are again transmitted to the control unit 24 via signal lines 28a and/or radiometrically in order to avoid rotation compatible connections. These detection/measurement signals are used in determining the actuating signals for the power unit 20.

Figure 2:
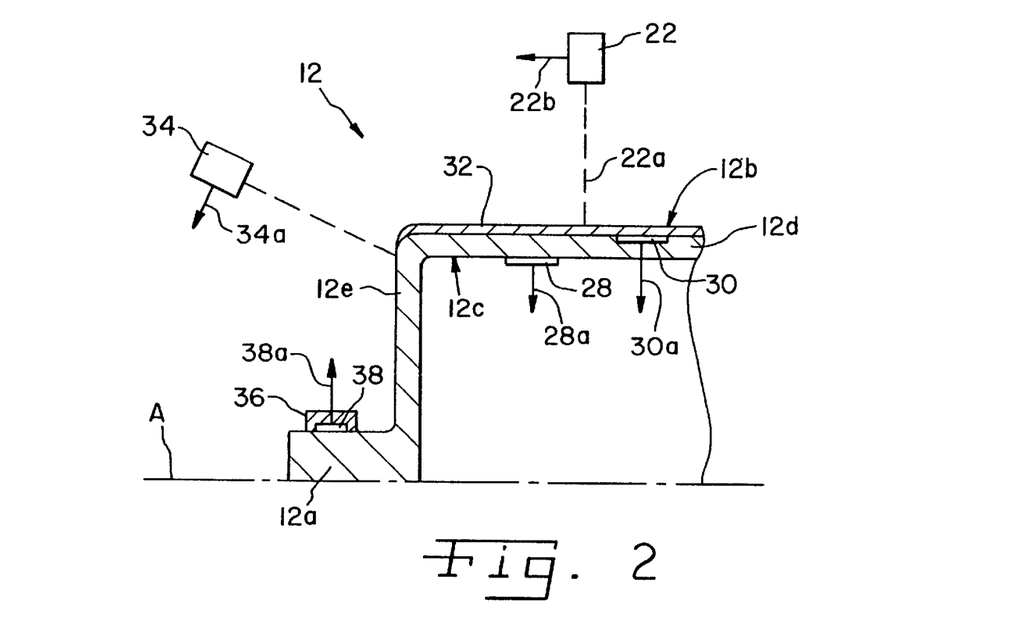
FIG. 2 is a sectional drawing along line II—II in FIG. 1.

Since the rolls utilized in machinery for the production and/or coating of material webs, specifically paper or cardboard webs, often must be and commonly are cooled, it is recommended that only such compression and/or tension sensitive elements 28 are utilized that are resistant to the cooling medium, for example, cooling water, or that these elements 28 are equipped with a protective layer or cover. Due to the location of the elements 28 on the interior 12c of the roll shell 12d, elements 28 are protected from damage by the material web 16 in the event of "wrap-up" of roll 12 and from contamination through splashes of coating medium 18. In that location, elements 28 will not inhibit access to the roll surface 12b by maintenance and/or operating personnel P.

In addition to the laser-vibrometer 22 and the compression and/or tension sensitive element 28, additional sensor units measure the vibration of roll 12. An example shows a compression and/or tension sensitive element 30 (FIG. 2) located on the outside of roll shell 12d which is protected from damage and/or contamination by a layer 32 (i.e., a protective roll cover) of rubber or rubber-type material, synthetic or similar material. Based on the fact that element 30 is located underneath the actual roll surface 12b, i.e., on the inner surface of layer 32, it does not hamper access by the operator P to the roll surface 12b. The measured signals of element 30 are transmitted via signal line 30a to the control unit 24 and are considered in determining the actuating signals for the power unit 20.

An additional sensor unit in the form of laser interferometer 34 detects/measures the mechanical stress/tension condition of the roll 12 and transmits a corresponding signal to the control unit 24, via a signal line 34a. Laser interferometers of this type are used, for example, in the field of non-destructive material analysis. Their utilization takes advantage of the fact that very high mechanical stresses/tensions occur in the roll 12 in the area of the machine center, i.e., in the longitudinal center of roll 12, in the area of the header section 12e of the roll 12, i.e., between the roll shell 12d and the roll journal 12a, in the transition areas between the header section 12e and the roll shell 12d, and in the area of transition between the header section 12e and the roll journal 12a.

In the embodiment shown, the laser interferometer 34 is pointed to the transition between the roll shell 12d and the roll header 12e. This offers the advantage that the laser-interferometer 34 may be positioned next to the roll 12, thereby permitting unhampered access to the roll surface 12b. Alternatively, the laser interferometer 34 can be located at a great distance from the roll 12.

Finally, in the embodiment shown, an acceleration sensor 38 is positioned in the area of bearing 36 of roll journal 12a and detects/measures the vibration of roll 12 due to the radial acceleration of the roll journal 12a. Acceleration sensors 38 of this type are, for example, utilized to verify the wear and tear condition of bearing 36. Suitably sensitive and continuously-operable acceleration sensors 38 can be used for monitoring of wear and tear as well as for measuring the vibration of roll 12. The measured signals of the acceleration sensors 38 are transmitted via signal lines 3 8a to control unit 24.

Since it is to be expected that the frequency spectrum of the vibrations of the roll 12 will change depending upon the prevailing operating conditions of the roll 12 or of the entire machine for the production and/or coating of the material web 16, and since the sensitivity frequency spectrum of the sensors is firmly predetermined, the control unit 24 combines the measured signals of at least two of the sensors 22, 28, 30, 34 and 38 in a suitable manner when determining the actuating signals for the power unit 20. The measured signals of the sensor are combined by, for example, superimposing additively and/or subtractively and/or averaged and/or weighted, depending upon the operating conditions, and/or phase corrected, depending on the arrangement along the circumference of the roll 12. It must be added that movements, particularly self-vibrations, of the sensor devices mounted on machinery components, for example sensors mounted in the area of the machine center, must be considered when interpreting the measured signals of these sensors.

The present invention further provides a method and apparatus to determine the distribution of the forces or pressure prevailing in the nip of a device for treating a traveling material web, specifically a paper or cardboard web, that includes a pressure element, for example a press roll, and a backing element, for example a backing roll, whereby the pressure element and the backing element together form a nip therebetween through which the material web travels. The apparatus for determining the pressure/force distribution provides precise information regarding the forces or pressures being exerted in the nip upon the material web, so that countermeasures may be taken in the event of excessive variations of these forces or pressures across the working width of the material web. The countermeasures create essentially constant treating conditions across the entire working width of the material web.

The present invention may be utilized in a multitude of different treating processes for material webs, including, for example, the press section of machinery for the production of a material web, glazing units, coating units, or even in printing machines. However, in the interest of clarity, the present invention will be discussed below in detail only in connection with a device for the application of a liquid or viscous coating medium onto a material web.

Conventionally, specialty papers were fed into the nip in order to determine the pressure distribution therein. For example, a two-ply layer of carbon paper and a light illustrating sheet or papers containing ink-filled beads which burst under pressure and release the ink were used to determine pressure distribution in a nip. In addition, the company Stowe Woodward suggested a thin film encompassing a multitude of pressure sensors, which is fed into the nip in place of the specialty papers and which can be utilized to automatically measure the force or pressure distribution prevailing in the nip. All of these devices for determining the pressure distribution, however, have the disadvantage that they only permit measurement of the pressure distribution under stationary conditions. Therefore, dynamic influences of the machinery motion upon the forces and pressures prevailing in the nip cannot be detected with the conventional devices for determining the pressure distribution described above. In addition, a lengthy and laborious procedure is necessary in order to determine the variation in the pressure distribution in the circumferential direction of the roll.

German patent document no. DE 196 42 047 A1 describes an arrangement of a multitude of pressure sensors in a stationary press shoe. The disadvantage in this solution is that the measurement of the pressure distribution occurs only in the area of the press shoe, thereby rendering expensive and difficult an allocation to certain locations around the circumference of the cover element that is continuously wrapped around the press shoe. Another disadvantage is that not only the continuous cover element is located between the pressure sensors and the material web, but also a lubricant, which reduces the friction between the cover element and the press shoe, and a film, which protects the pressure sensors from the lubricant.

The present invention provides a method and apparatus which permit reliable determination of the pressure distribution prevailing in the nip even during operation of the treating/converting unit so that, when determining corrective control values, the dynamic effects are considered.

The present invention provides a treating unit in which at least one of the elements—pressure element or backing element—is a roll, and in which the device for determining the pressure distribution includes a sensor arrangement having a multitude of sensors arranged in circumferential direction and in axial direction of the roll. In this embodiment of the treating unit, it is ensured that the sensors of the aforementioned sensor arrangement are located in the immediate area of the surface that is in contact with the material web. Thus, the measured values possess a high degree of meaningfulness by reflecting the conditions to which the material web is subject. On the other hand, the sensors are not only arranged in the axial direction of the roll, thereby permitting the determination of the pressure distribution across the working width, but are also arranged in the circumferential direction of the roll, thereby enabling determination of the pressure distribution in the nip at any given rotational position of the roll. Therefore, the present invention provides for the determination of the prevailing pressure in the nip at all times, including when the treating unit is at a standstill and during full speed operation of the treating unit.

Preferably, the sensors are designed and/or provided for indirect or direct pressure/compression measurement. If there is no, or only negligible, danger of damaging the surface of the material web, the sensors for detecting/measuring the pressure can be located directly on the surface of the roll.

If a roll is equipped with a resilient elastomer-type protective cover layer, i.e., rubber, rubber-type material or synthetic material, it is suggested that at least some of the sensors within the sensor arrangement be located at the outside surface of the roll underneath this protective cover layer. In an applicator unit, this protective cover layer protects the pressure/compression sensors from the possibly detrimental consequences of exposure to the coating medium. The protective cover layer is the only layer between the material web and the sensors that influences the measured results. Therefore, placing the sensors under the protective cover layer permits meaningful measurements which correlate to the conditions to which the material web is exposed, together with a long life span of the sensor arrangement. The lines leading to the sensors, for example, the power supply lines and the signal transmission lines, are also routed underneath this protective cover layer.

In addition, or alternatively, to installing the sensors under the protective cover layer, at least some of the sensors of the sensor arrangement are embedded in the roll shell. This embedding may be accomplished during the manufacture of the roll, especially when the roll is manufactured from fiber reinforced synthetic material such as, for example, carbon fiber reinforced synthetic material. However, with both fiber reinforced synthetic rolls and steel rolls it is possible to embed the sensors after manufacture of the roll. Correspondingly, the lines leading to the sensors may also be embedded in the roll shell either during original manufacture or at a later date.

It is suggested that at least some of the sensors are grouped in a thin sensor plate or sensor foil. This arrangement offers the advantage of trouble free treating, particularly when the sensors are located underneath a protective cover layer.

The sensors convert the value of the measured pressure/compression into electric voltages which can easily be processed by an evaluation unit. With the use of suitable evaluation software it is, for example, possible to track on a screen exactly how the force distribution changes across a web width as the line pressure is influenced in the nip. A signal provided by the sensor arrangement is considered in the control function of a power unit controlling the pressure element and/or the backing element. The line pressure may be purposefully influenced during operation of the treating unit, and the changes in the force or pressure distribution resulting from this may be observed in real time. This enables optimization of the conditions prevailing in the nip automatically, if appropriate controls software is used, or manually through an operator, and ensures a high quality treating result.

The present invention also provides a roll fitted with a sensor arrangement which is utilized, for example, in the previously discussed treating line. Such "sensor-rolls" may, however, also be used advantageously in instances where pressure is exerted upon the roll merely through the effects of the traveling material web without the influence of a backing element. An example would be web guide rollers.

In this embodiment, an applicator device is generally identified with 510 (FIG. 3) that includes two rolls 512 and 513 which rotate around axes A and B (arrows P and P') and which together form a nip 515. The nip 515 is supplied by two applicator units (not shown) with liquid or viscous coating medium 518. Coating medium 518 is supplied onto a material web 516 which is traveling through the nip 515 in the direction of arrow L.

Roll 512 determines the distribution of the pressures or forces prevailing in the nip 515 in cross direction Q. The roll 512 includes a rigid roll shell 550 which may, for example, be manufactured from steel or fiber reinforced synthetic material, and a cover layer 552 of resilient rubber-elastomer material such as, for example, rubber, rubber-type material or suitable resilient natural or synthetic material. Roll 512, as shown in the area that is without the cover layer 552, includes a multitude of pressure/compression sensors 554 located underneath cover layer 552 in circumferential direction U and in axial direction A. The power supply lines leading to these pressure/compression sensors, and the signal lines leading away from these sensors, (identified together as 556 in FIG. 3) are routed underneath the cover layer 552.

Figure 3:
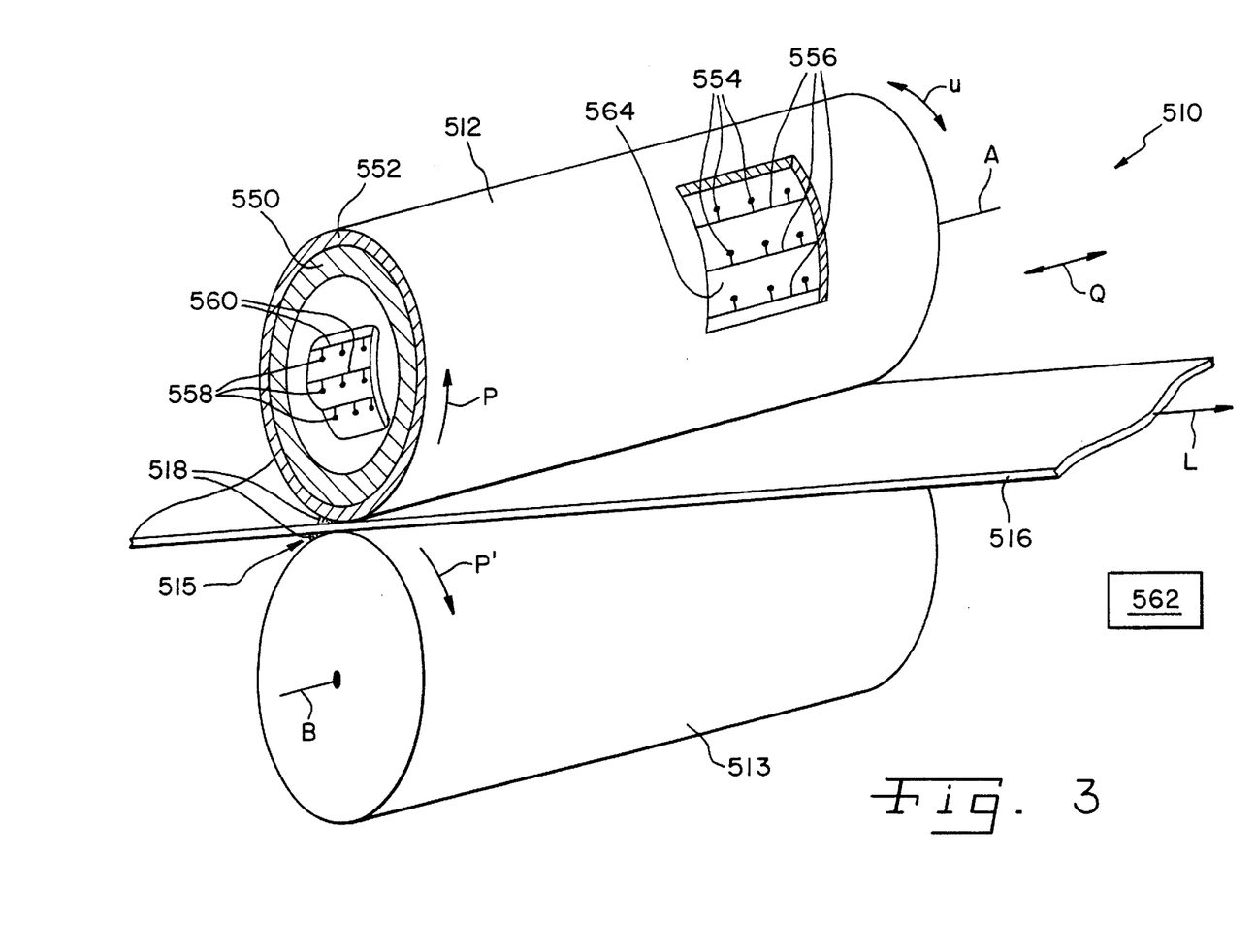
FIG. 3 is a perspective view of the applicator device of FIG. 1.

In addition, or alternatively, to the compression sensors 554, compression/pressure sensors 558 are embedded in the roll shell 550, and arranged in both circumferential direction U and axial direction A. This permits determination/measurement of the pressure distribution in nip 515 in cross direction Q for any given rotational position of the roll 512. The lines 560 to the sensors 558 are also embedded in the roll shell 550.

In the embodiment shown, the sensors 554 are integrated in a pre-manufactured sensor arrangement including a thin backing foil 564 which simplifies their installation under the cover layer.

The measuring results obtained by the sensor arrangement 554 or the sensor arrangement 558 are transmitted to evaluation device 562 which, in accordance with a first embodiment, enables the operator to determine where and to what extent the line pressure in the nip 515 must be influenced through one or more power units (not shown) in order to ensure an essentially uniform pressure or force distribution in the nip 515. In a second embodiment, the evaluating device 562 additionally determines the location and the magnitude of the influence over the line pressure and provides a corresponding signal to an appropriate power unit.

Sensor arrangements similar to the sensor arrangements 554/556 and 558/560 may also be provided in the roll 513, resulting in a further improvement of the meaningfulness of the detected/measured results.

According to the aforementioned it is possible with the applicator device or the device for determining the pressure distribution of the present invention—even under dynamic conditions, i.e., in an applicator unit running at full production speed—to determine the distribution of the forces or pressures prevailing in the nip and to thereby create reproducible and uniform coating conditions in the nip, thus ensuring a uniform and high quality coating result.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for actively reducing vibration in a first rotating roll, the first rotating roll being utilized in a machine, the machine including a second rotating roll, a nip defined between the first rotating roll and the second rotating roll through which a material web travels, the first rotating roll having a first axis of rotation and the second rotating roll having a second axis of rotation, said apparatus comprising:

at least one sensor disposed in a plane common to the first axis of rotation and the second axis of rotation, said at least one sensor configured for detecting the vibration of the first rotating roll and providing at least one sensor signal indicative of the detected vibration; and at least one power unit receiving said at least one sensor signal and being configured to influence the first rotating roll dependent upon said at least one sensor signal, said power unit thereby reducing the vibration of the first rotating roll.

2. The apparatus of claim 1, wherein said at least one sensor comprises at least one of a compression sensitive element and a tension sensitive element.

3. The apparatus of claim 2, wherein said tension sensitive element comprises at least one wire strain gauge.

4. The apparatus of claim 2, wherein said at least one sensor is disposed on an inside surface of the rotating roll.

5. The apparatus of claim 2, wherein a cover layer substantially surrounds the outer surface of the rotating roll, said at least one sensor being disposed intermediate the cover layer and the outer surface of the rotating roll.

6. The apparatus of claim 5, wherein the cover layer is one of a rubber, rubber-type, and synthetic material.

7. An apparatus for actively reducing vibration in a rotating roll having an axis of rotation and a substantially cylindrical outer surface, said apparatus comprising:

at least one sensor disposed remotely from the substantially cylindrical outer surface of the rotating roll relative to the axis of rotation, said at least one sensor being configured for detecting the vibration of the rotating roll and providing at least one sensor signal indicative of the detected vibration, at least one said sensor being an optical sensor device, each said optical sensor device being one of a laser-vibrometer and a laser interferometer, each said laser interferometer being configured for interferometrically measuring a mechanical stress of one of on the outer surface of the rotating roll and at a predetermined area of a header section of the rotating roll; and at least one power unit device receiving said at least one sensor signal and being configured for influencing the rotating roll dependent upon said at least one sensor signal, said at least one power unit thereby reducing the vibration of the rotating roll.

8. The apparatus of claim 7, wherein said at least one optical sensor device comprises a laser-vibrometer.

9. The apparatus of claim 7, wherein said at least one optical sensor device is a laser interferometer configured for interferometrically measuring a mechanical stress of the outer surface of the rotating roll.

10. The apparatus of claim 9, wherein the outer surface of the roll comprises a substantially cylindrical outer shell.

11. The apparatus of claim 7, wherein said at least one optical sensor device is a laser interferometer configured for interferometrically detecting the mechanical stress at a predetermined area of a header section of the rotating roll.

12. The apparatus of claim 7, wherein said at least one optical sensor device is configured for being disposed at a distance of at least 1 meter from the outside surface of the rotating roll.

13. An apparatus for actively reducing vibration in a first rotating roll, the first rotating roll being utilized in a machine, the machine including a second rotating roll, a nip defined between the first rotating roll and the second rotating roll through which a material web travels, the first rotating roll having a first axis of rotation and a first inside surface, the first inside surface defining a first roll interior, and the second rotating roll having a second axis of rotation, said apparatus comprising:

at least one sensor configured for detecting the vibration of the first rotating roll, said at least one sensor issuing at least one sensor signal indicative of the vibration of the first rotating roll, said at least one sensor comprises a plurality of sensors, at least one said sensor being one of a bearing sensor disposed at a bearing of the first rotating roll and an embedded sensor embedded in the first rotating roll, each said sensor comprising one of a compression sensitive element, a tension sensitive element and an acceleration sensor, each said sensor issuing a respective sensor signal, said control unit determining said actuating signal based upon at least one of an additive, subtractive, weighted, averaged, and phase corrected combination of each said sensor signal;

a control unit receiving said at least one sensor signal and issuing an actuating signal, said actuating signal being dependent upon said sensor signal; and at least one power unit configured to influence the first rotating roll dependent upon said actuating signal, said power unit thereby reducing the vibration of the first rotating roll.

14. The apparatus of claim 13, wherein at least one of said plurality of sensors comprises a bearing sensor.

15. The apparatus of claim 13, wherein said apparatus is configured for use in a machine for one of the production, coating, and treating of a fiber material web.

16. A method of actively reducing undesirable vibration in a rotating roll having an axis of rotation, an inside surface defining a roll interior and a substantially cylindrical outer surface, said method comprising the steps of:

detecting vibration of the rotating roll with a plurality of sensor devices, at least one said sensor device being disposed one of within the roll and remotely from a substantially cylindrical outer surface of the rotating roll relative to the rotational axis, at least one said sensor device being disposed within the roll interior, at least one said sensor device comprising at least one of a compression sensitive element and a tension sensitive element; and influencing the rotating roll dependent upon said detecting step with a power unit device to thereby reduce the vibrations of the rotating roll.

17. The method of claim 16, wherein said tension sensitive element comprises a wire strain gage.

18. The method of claim 16, wherein said at least one sensor device disposed within the roll interior is disposed on the inside surface of the rotating roll.

19. The method of claim 16, wherein the rotating roll includes a cover layer substantially surrounding the substantially cylindrical outer surface of the rotating roll, at least one said sensor device being disposed intermediate the outer surface of the rotating roll and the cover layer.

20. The method of claim 19, wherein the cover layer is comprised of one of rubber, rubber-like, and synthetic material.

21. A method of actively reducing undesirable vibration in a rotating roll having an axis of rotation and a substantially circular cylindrical outer surface, said method comprising the steps of:

detecting vibration of the rotating roll with at least one sensor device, said at least one sensor device disposed one of within the substantially cylindrical outer surface of the rotating roll relative to the rotational axis and remotely from a substantially circular cylindrical outer surface of the rotating roll relative to the rotational axis, at least one said sensor device comprising an optical sensor devices each said optical sensor device being one of a laser-vibrometer and a laser interferometer, each said laser interferometer interferometrically measuring a mechanical stress of one of on the outer surface of the rotating roll and on a header section of the rotating roll; and influencing the rotating roll dependent upon said detecting step with a power unit device to thereby reduce the vibrations of the rotating roll.

22. The method of claim 21, wherein said at least one optical sensor comprises a laser-vibrometer.

23. The method of claim 21, wherein said at least one optical sensor device detects interferometrically a mechanical stress on a surface of the roll.

24. The method of claim 23, wherein the surface of the roll comprises a substantially cylindrical shell.

25. The method of claim 24, wherein said at least one said optical sensor device detects interferometrically a mechanical stress on one said header section of the roll.

26. The method of claim 21, wherein said optical sensor is disposed at least one meter from the outer surface of the roll.

27. A method of actively reducing vibration in a first rotating roll, the first rotating roll being utilized in a machine, the machine including a second rotating roll, a nip being formed between the first rotating roll and the second rotating roll through which a material web travels, the first rotating roll having a first axis of rotation and the second rotating roll having a second axis of rotation, said method comprising the steps of:

providing at least one sensor disposed in a plane common with the first axis of rotation and the second axis of rotation;

detecting the vibration of the first rotating roll with said at least one sensor; and influencing the first rotating roll dependent upon said detecting step with a power unit to thereby reduce the vibrations of at least the first rotating roll.

28. A method of actively reducing vibration in a first rotating roll, the first rotating roll being utilized in a machine, the machine including a second rotating roll, a nip being formed between the first rotating roll and the second rotating roll through which a material web-travels, the first rotating roll having a first axis of rotation and a first inside surface, the first inside surface defining a first roil interior, and the second rotating roll having a second axis of rotation, said method comprising the steps of:

providing at least one sensor device, said at least one sensor device comprising a plurality of sensors, at least one said sensor being one of a bearing sensor disposed at a bearing of the first rotating roll and an embedded sensor embedded in the first rotating roll, each said sensor comprising one of a compression sensitive element, a tension sensitive element and an acceleration sensor, each said sensor issuing a respective sensor signal, said actuating signal determined by at least one of an additive, subtractive, weighted, averaged, and phase corrected combination of each said sensor signal;

detecting the vibration of the first rotating roll with said at least one sensor device;

issuing an actuating signal, said actuating signal based at least in part upon said detecting step; and influencing the first rotating roll dependent upon said actuating signal with a power unit device to thereby reduce the vibrations of the first rotating roll.

29. The method of claim 28, wherein at least one of said plurality of sensors comprises a bearing sensor.

30. The method of claim 28, said method being utilized with a machine for one of producing, treating and coating of a fiber material web.

* * * * *

UNITED STATES PATENT AND TRADEMARK OFFICE
CERTIFICATE OF CORRECTION

PATENT NO.     : 6,387,214 B1
DATED          : May 14, 2002
INVENTOR(S)    : Kustermann et al.

It is certified that error appears in the above-identified patent and that said Letters Patent is hereby corrected as shown below:

Column 6,
Line 43, delete "3 8a" and substitute -- 38a -- therefor.

Column 12,
Line 25, delete "devices" and substitute -- device, -- therefor.

Column 13,
Line 3, delete "roil" and substitute -- roll -- therefor.

Signed and Sealed this

Seventeenth Day of June, 2003

JAMES E. ROGAN
*Director of the United States Patent and Trademark Office*